US012775356B1

(12) United States Patent
Kianzad et al.

(10) Patent No.: US 12,775,356 B1
(45) Date of Patent: Oct. 27, 2026

(54) SYSTEMS AND METHODS FOR DETECTING AND FILTERING UNINTENTIONAL TOUCHES ON A TRACKPAD

(71) Applicant: Huawei Technologies Co., Ltd., Shenzhen (CN)

(72) Inventors: Soheil Kianzad, Toronto (CA); Wei Li, Toronto (CA); Shuping Lu, Toronto (CA); Zehao Zhang, Scarborough (CA); Yuan Deng, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/348,565

(22) Filed: Oct. 2, 2025

Related U.S. Application Data

(63) Continuation-in-part of application No. 19/278,396, filed on Jul. 23, 2025.

(Continued)

(51) Int. Cl.
*G06F 3/041* (2006.01)
*G06F 3/0354* (2013.01)
*G06F 3/044* (2006.01)

(52) U.S. Cl.
CPC ........ *G06F 3/0418* (2013.01); *G06F 3/03547* (2013.01); *G06F 3/044* (2013.01); *G06F 2203/04104* (2013.01)

(58) Field of Classification Search
CPC .... G06F 3/0418; G06F 3/03547; G06F 3/043; G06F 2203/04104
See application file for complete search history.

(56) References Cited

U.S. PATENT DOCUMENTS

| | | | |
|---|---|---|---|
| 8,098,233 | B2 | 1/2012 | Hotelling et al. |
| 8,537,541 | B2 | 9/2013 | Zhang |
| 2011/0316774 | A1 | 12/2011 | Clifton et al. |

(Continued)

FOREIGN PATENT DOCUMENTS

| | | | |
|---|---|---|---|
| CN | 115237271 | A | 10/2022 |

OTHER PUBLICATIONS

Gu, Jiseong et al., "LongPad: A Touchpad Using the Entire Area below the Keyboard of a Laptop Computer," In Proceedings of the SIGCHI Conference on Human Factors in Computing Systems, Apr. 27, 2013, pp. 1421-1430.

(Continued)

*Primary Examiner* — Robert J Michaud
(74) *Attorney, Agent, or Firm* — Slater Matsil, LLP

(57) ABSTRACT

Methods and devices for identifying unintentional touch events on or near a virtual trackpad by using capacitive sensing to accurately detect and distinguish between intentional gestures and unintentional palm or thumb contact. Touch events within palm rest regions on either side of a virtual trackpad may be identified and tracked to determine when to adapt the handling of trackpad data, including possibly disabling the trackpad. Two touchpoints within a trackpad may be identified and the distance between them used in determining how to adapt the handling of trackpad touch data to identify and exclude unintentional touches. A virtual trackpad button touch may be identified as a button press, a gesture or an unintentional touch by buffering frames of capacitive data, with the determination partly based on touch speed and trajectory.

30 Claims, 10 Drawing Sheets

Related U.S. Application Data

(60) Provisional application No. 63/807,195, filed on May 16, 2025.

(56) References Cited

U.S. PATENT DOCUMENTS

| | | | | |
|---|---|---|---|---|
| 2013/0328832 | A1 | 12/2013 | Boumgarten | |
| 2015/0253874 | A1 | 9/2015 | Reyes | |
| 2019/0073036 | A1 | 3/2019 | Bernstein et al. | |
| 2021/0255826 | A1 * | 8/2021 | Devine | G06F 1/163 |
| 2022/0337741 | A1 | 10/2022 | Paul et al. | |
| 2025/0190105 | A1 * | 6/2025 | Li | G06F 3/0233 |

OTHER PUBLICATIONS

Kim, Sunjun et al., "TapBoard: Making a Touch Screen Keyboard More Touchable," In Proceedings of the SIGCHI Conference on Human Factors in Computing Systems, Apr. 27, 2013, pp. 553-562.

Li, Zhuojun et al., "ResType: Invisible and Adaptive Tablet Keyboard Leveraging Resting Fingers," In Proceedings of the 2023 CHI Conference on Human Factors in Computing Systems, Apr. 19, 2023, pp. 1-14.

Rendl, Christian et al., "Presstures: Exploring Pressure-Sensitive Multi-Touch Gestures on Trackpads," In Proceedings of the SIGCHI conference on human factors in computing systems, Apr. 26, 2014, pp. 431-434.

Schwarz, Julia et al., "Probabilistic Palm Rejection Using Spatiotemporal Touch Features and Iterative Classification," In Proceedings of the SIGCHI Conference on Human Factors in Computing Systems, Apr. 26, 2014, pp. 2009-2012.

* cited by examiner

SYSTEMS AND METHODS FOR DETECTING AND FILTERING UNINTENTIONAL TOUCHES ON A TRACKPAD

CROSS-REFERENCE TO RELATED APPLICATIONS

The present application is a continuation-in-part of U.S. patent application Ser. No. 19/278,396, filed Jul. 23, 2025, and which claims priority to U.S. Provisional Patent Application No. 63/807,195, filed May 16, 2025, the contents of both of which are hereby incorporated by reference.

FIELD OF THE DISCLOSURE

The present disclosure relates generally to capacitive signal processing, and in particular to systems and methods for capacitive signal processing strategy for detecting and filtering unintentional touches on a trackpad.

BACKGROUND

In modern computing devices, particularly those with trackpads and keyboards, unintended trackpad activations due to palm or thumb contacts pose a significant challenge. These undesired interactions can hinder the user experience, especially during typing and interaction with the device. For example, when a user's palm or part of the hand unintentionally makes contact with the trackpad, it can trigger accidental gestures or cursor movements. This is particularly common when resting the hand while typing, resulting in palm pressure on the trackpad and causing unintended actions. Also, during typing or interacting with the device, fingers may accidentally brush across the trackpad. These small, involuntary movements can inadvertently trigger undesired functions, such as clicks or dragging. In some cases, wrist or arm movements can lead to contact with the trackpad, resulting in unwanted activation of functions. For example, sliding the hand across the device while typing may cause unintentional touches on the trackpad. Several technologies exist that attempt to address touchpad interference issues, particularly with accidental palm detection, but these solutions do not fully resolve the challenges posed by palm, wrist, or thumb interactions during typing or trackpad use.

SUMMARY

The present application seeks to address the technical problems associated with palm and unintentional touch detection on virtual trackpads and keyboards, especially in the context of portable computing devices such as laptops and tablets. The application may introduce dynamic sensitivity adjustments based on real-time user interactions, aiming to improve accuracy and user experience. This application provides a practical, context-based solution to prevent unintentional touches on virtual trackpads by considering key interaction behaviors. In some examples, it describes methods that take into account factors such as whether the user is typing, the direction of movements when entering the trackpad area, and how gestures are initiated and continue. This dynamic approach ensures that only intentional user input is recognized while minimizing accidental touches, offering a more intuitive and efficient touch interaction experience.

In one aspect, the present application describes a computer-implemented method that includes receiving capacitive signal data from a touch-sensitive surface that includes a virtual trackpad region on the touch-sensitive surface. wherein the capacitive signal data indicates a touch event in at least one of one or more designated regions on the touch sensitive surface. The method further includes determining from one or more characteristics of capacitive signal data associated with the touch event that the touch event is an unintentional touch and based on the unintentional touch, adapting handling of capacitive signal data associated with the trackpad region for a period of time. In some embodiments, the virtual trackpad region is below a virtual keyboard displayed on the touch sensitive surface.

In some implementations, the adapting includes disabling at least a portion of the trackpad region during the period of time.

In some implementations, the adapting includes setting the size of the portion of the trackpad region based on the one or more characteristics of the capacitive signal data associated with the touch event.

In some implementations, the one or more designated regions comprise two palm rest regions laterally adjacent to, and on either side of, the virtual trackpad region.

In some implementations, adapting includes increasing a touch detection threshold in the trackpad region. This may be done to reduce detection of accidental touches.

In some implementations, the adapting handling of capacitive signal data includes disabling the trackpad region based on detection of one or more keypress events, independent of any palm-rest detection.

In some implementations, the determining that the touch event is an unintentional touch is based, at least in part, on a size of a capacitive blob defined by the touch event being above a size threshold.

In some implementations, the capacitive signal data indicates a capacitive blob associated with the touch event, and determining that the touch event is an unintentional touch is based on at least two or more of a size of the capacitive blob, a movement of the capacitive blob, a shape of the capacitive blob, a location of the capacitive blob, and an intensity of the capacitive blob.

In some implementations, the determining that the touch event is an unintentional touch includes determining a trajectory or speed associated with the touch event and, based on the trajectory or speed, identifying the touch event as a palm rest.

In some implementations, the capacitive signal data further includes data indicating one or more touch events on the virtual keyboard, and the determining that the touch event is an unintentional touch is further based on the one or more touch events on the virtual keyboard in combination with the capacitive signal data associated with the touch event in the at least one of two palm rest regions. In some cases, the determining that the touch event is an unintentional touch is partly based on a keypress detected on the virtual keyboard.

In some implementations, determining that the touch event is an unintentional touch is based on providing characteristics of the touch event to a trained Bayesian model and receiving from the trained Bayesian model a probability that the touch event is unintentional and comparing the probability to a probability threshold value.

In some implementations, determining that the touch event is an unintentional touch includes determining, from the capacitive signal data associated with the touch event, a probability that the touch event is unintentional and comparing the probability to a probability threshold value.

In some cases, the probability is a probability that the touch event is a palm rest.

In some implementations, the period of time has a maximum length of time and the period of time ends when a time elapsed reaches the maximum length of time. In some embodiments, a timer is set to the maximum length of time when the unintentional touch is identified. In some implementations, the maximum length of time is based, at least in part, on a historical typing speed. In some implementations, the period of time ends when a determination is made that that a further touch event is an intentional touch on the trackpad. In some implementations, the period of time ends when one of one or more designated buttons are pressed. In some implementations, the one or more designated buttons are buttons on the virtual keyboard.

In another aspect, the present application describes a computing device that includes one or more processors; a touch-sensitive surface coupled to the one or more processors; and memory storing processor-executable instructions. When executed by the one or more processors, the instructions are to cause the one or more processors to perform any of the methods described herein.

In another aspect, the present application describes a computer-implemented method that may include receiving capacitive signal data from a touch-sensitive surface that includes a virtual trackpad region above which a virtual keyboard is displayed on the touch-sensitive surface, wherein the capacitive signal data indicates at least two touchpoints in the virtual trackpad region; determining a distance between the at least two touchpoints; determining that at least one of the at least two touchpoints is an unintentional touch based, at least in part, on a distance between the at least two touchpoints; and based on the unintentional touch, adapting handling of the capacitive signal data associated with the trackpad region.

In some implementations, the determining that at least one of the at least two touchpoints is an unintentional touch is further based, at least in part, on one or more of a size, movement, or intensity of the at least two touchpoints.

In some implementations, adapting handling of the capacitive signal data includes increasing a touch detection threshold for detection for at least a portion of the trackpad region.

In some cases, the at least a portion includes one or more border regions of the virtual trackpad region. In some cases, increasing a touch detection threshold includes setting the touch detection threshold based on the distance, wherein a shorter distance results in a higher touch detection threshold.

In some implementations, the determining that at least one of the at least two touchpoints is an unintentional touch is further based, at least in part, on a location on the virtual trackpad of the at least one of the at least two touchpoints.

In some implementations, adapting handling of the capacitive signal data includes identifying one of the at least two touchpoints as unintentional and excluding that one of the least two touchpoints when processing the other of the at least two touchpoints as an input.

In some implementations, adapting handling of the capacitive signal data includes determining that one of the at least two touchpoints is a palm or thumb touch and determining that the other of the at least two touchpoints is a gesture, and ignoring capacitive signal data associated with the palm or thumb touch.

In yet a further aspect, the present application describes a computer-implemented method that may include receiving capacitive signal data from a touch-sensitive surface that includes a trackpad region above which a virtual keyboard is displayed on the touch-sensitive surface, wherein a portion of the trackpad region includes a virtual trackpad button, and wherein the capacitive signal data indicates a touch event within the portion of the trackpad region corresponding to the virtual trackpad button; based on the touch event associated with the virtual trackpad button, buffering two or more frames of the capacitive signal data from the touch-sensitive surface; determining, from the buffered two or more frames of capacitive signal data, whether the touch event is a button press, a gesture, or an unintentional touch; and in response to the determination, processing the touch event accordingly.

In some implementations, the buffering includes buffering frames until the determination of whether the touch event is a button press, a gesture, or an unintentional touch is made with sufficient confidence, subject to a maximum number of frames.

In some implementations, the determining whether the touch event is a button press, a gesture, or an unintentional touch is based on one or more characteristics of the touch event.

In some cases, the one of more characteristics include whether there is a single touch event in the trackpad region or whether there are multiple touch events in the trackpad region including the touch event associated with the virtual trackpad button.

In some cases, the one of more characteristics include one or more of size, speed, trajectory, and intensity of the touch event.

In some implementations, the determining whether the touch event is a button press, a gesture, or an unintentional touch includes determining that the touch event is a button press based on the touch event having an upwards trajectory from the virtual trackpad button.

In some implementations, the determining whether the touch event is a button press, a gesture, or an unintentional touch includes calculating a probability that the touch event is a button press, and wherein the probability is partly based on a speed and trajectory of the touch event associated with the virtual trackpad button.

In some implementations, processing the touch event includes processing the touch event with gesture handling when the touch event is determined to be a gesture and not invoking a button press operation; processing the touch event as a button press when the touch event is determined to be a button press; and adapting handling of the capacitive signal data for at least a portion of the trackpad region when the touch event is determined to be unintentional.

In some cases, the adapting handling of the capacitive signal data includes ignoring the touch event in the portion of the trackpad region corresponding to the virtual trackpad button or increasing a touch detection threshold for at least a part of the trackpad region including the portion corresponding to the virtual trackpad button.

In another aspect, the present application describes a non-transitory, computer-readable medium storing instructions that, when executed by a processor, configure the processor to perform one or more of the methods described herein.

In another aspect, the present application describes a device that is configured to perform one or more of the methods described herein.

In another aspect, the present application describes a processor that is configured to execute instructions to cause a device to perform one or more of the methods described herein.

In another aspect, the present application describes an integrated circuit that is configured to perform one or more of the methods described herein.

In another aspect, the present application describes a module comprising one or more circuits for performing one or more of the methods described herein.

In another aspect, the present application describes an apparatus comprising one or more processors functionally connected to a memory for performing one or more of the methods described herein.

In another aspect, the present application describes an apparatus that is configured to perform one or more of the methods described herein.

In another aspect, the present application describes a non-transitory, computer-readable storage media storing instructions that, when executed, cause at least one processing unit, at least one processor, or at least one circuit to perform one or more of the methods described herein.

In another aspect, the present application describes a computer program product including instructions that, when executed by an apparatus, enable the apparatus to implement one or more of the methods described herein.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Reference will now be made, by way of example, to the accompanying drawings in which.

Like reference numerals are used in the drawings to denote like elements and features.

DETAILED DESCRIPTION

The present application addresses several technical problems associated with unintended touch inputs on virtual trackpads during user interaction, especially while typing or performing multi-finger gestures. For example, while typing, the palm or thumb resting on the trackpad can be misinterpreted as a touch, causing unintended scrolling, clicking, or movement. This results in distractions or accidental actions, leading to a poor user experience. In another example, when a user's thumb or hand rests on the edge of the trackpad, it can inadvertently trigger gestures or button presses, especially when typing or performing other gestures. In yet another example, when a user initiates a two-finger gesture or other interactions starting from the button area of the trackpad, it can lead to mistaken button presses, such as unintentional clicks or activation of trackpad buttons. In yet a further example, when two fingers start a gesture near the trackpad's edge, accidental button presses or unintended actions can occur. In another example, when a user interacts with the virtual keyboard and trackpad simultaneously, accidental touches from palm or fingers resting on the trackpad can cause unintended actions, interfering with typing or other interactions.

The present application addresses some of the challenges of unintentional touch inputs on virtual trackpads by using capacitive sensing to accurately detect and distinguish between intentional gestures and unintentional palm or thumb contact.

Figure 1:
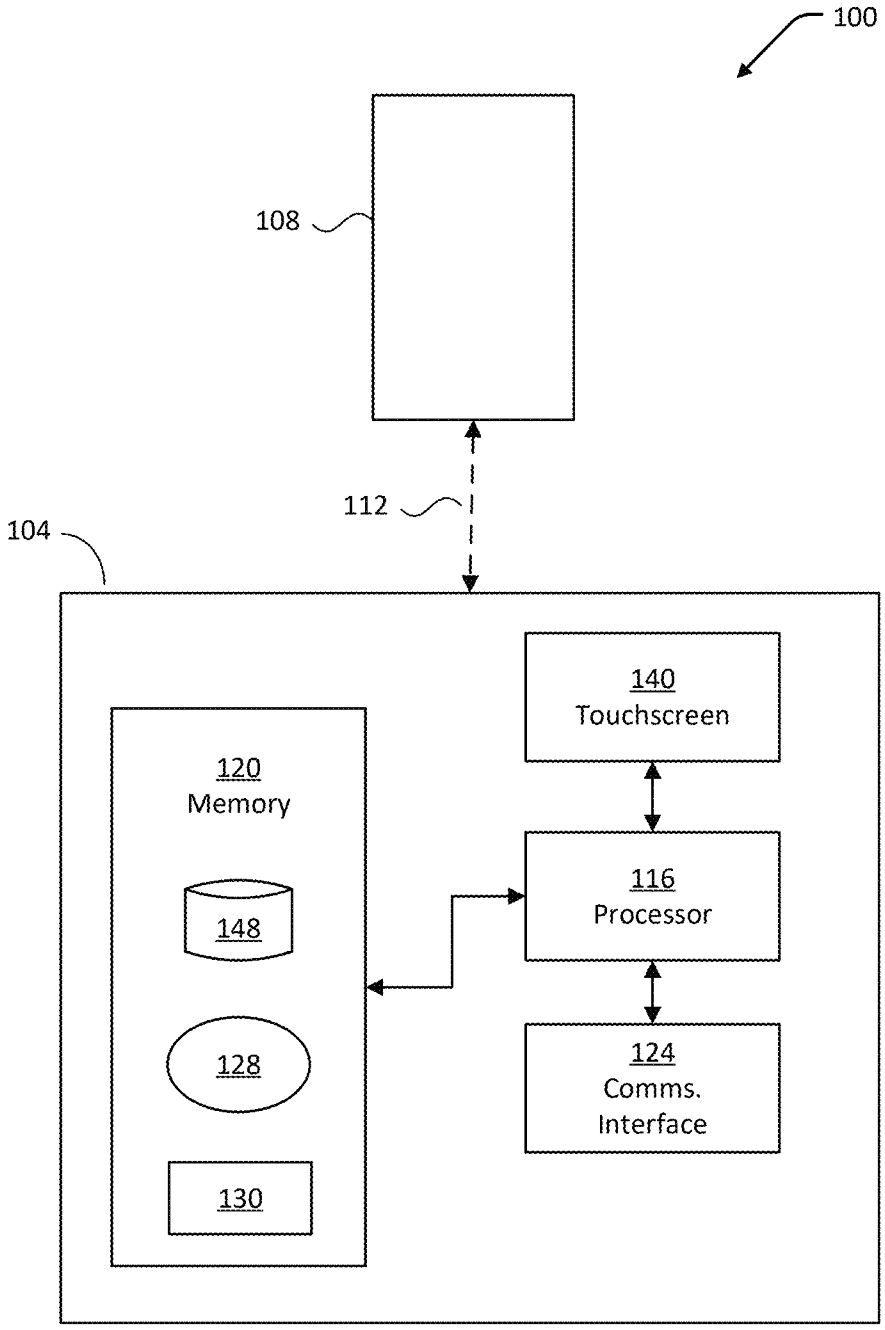
FIG. 1 illustrates a first example system and computing device.

FIG. 1 depicts an example system 100 including a device 104 configured to implement one or more of the methods described herein. The device 104 may be in communication with a second computing device 108 via one or more communication links 112, including wired and/or wireless communication links, combinations thereof, links which traverse one or more networks, including local area networks, wide-area networks, the internet, and the like.

The devices 104 and 108 may be any suitable computing devices, such as, but not limited to, mobile computing devices such as phones, smart phones, tablets, laptop computers, handheld and/or wearable devices, and the like, or fixed computing devices, such as desktop computers, servers, kiosks, and the like.

The device 104 includes a processor 116, a memory 120 and a communications interface 124.

The processor 116 may include a central processing unit (CPU), a microcontroller, a microprocessor, a processing core, a field-programmable gate array (FPGA), a graphics processing unit (GPU), or similar. The processor 116 may include multiple cooperating processors. The processor 116 may cooperate with the memory 120 to realize the functionality described herein.

The memory 120 may include a combination of volatile (e.g., Random Access Memory or RAM) and non-volatile memory (e.g., read-only memory or ROM, Electrically Erasable Programmable Read Only Memory or EEPROM, flash memory). All or some of the memory 120 may be integrated with the processor 116. The memory stores applications 128, each including a plurality of computer-readable instructions executable by the processor 116. The execution of the instructions by the processor 116 configures the device 104 to perform the actions discussed herein. In particular, the applications 128 stored in the memory 120 include applications to perform methods for language processing. When executed by the processor 116, the applications 128 configures the processor 116 and/or the device 104 to perform various functions discussed herein in greater detail.

The device 104 further includes a touchscreen 140. The touchscreen 140 may be a capacitive touchscreen. The touchscreen 140 displays graphics, text, and other UI elements under control of the processor 116, and is configured to detect touch events. The touchscreen 140 and its associated hardware and software may provide touch event data to the processor 116 and/or associated applications 128 or other software. The touch event data may include data regarding capacitive touch signals from points on the touchscreen.

The memory may further include one or more operating systems 130, any one of which may in some cases be configured to run within a virtual machine. The one or more operating systems 130 allow the applications 128 to access the processor 116, the memory 120, I/O devices and/or modules, such the touchscreen 140, and the communications interface 124. The operating system 130 may, for example, be iOS™, Android™, Linux™, Microsoft Windows™, or the like. Many of the operations, methods, or processes described herein may be implemented within the operating system 130. The operating system 130 may implement touchscreen software configured to receive touch data from the touchscreen 140, through one or more touchscreen interfaces, such as a touch host processing capacitive interface in some examples. The touch host processing capacitive interface may capture touch data from the matrix of capacitive sensors associated with the touchscreen 140. The data may be a matrix of capacitive readings from the grid of sensors. In some implementations, various cleaning or signal processing operations may be performed on the capacitive signals. In some implementations, the capacitive signal data may be provided to the touchscreen software when one or more capacitive signal readings exceeds a noise threshold.

The I/O devices and/or modules (not illustrated) may include microphone(s) that can receive the voice/sound inputs; speaker(s) that can output any kind of sound effects; vibration motor(s) that can provide tactile feedback through vibration; and/or a stylus that can serve as an input/interaction device through the touchscreen 140 or other touch-sensitive I/O surfaces.

In some cases, the touchscreen 140 may display a virtual keyboard. The operating system 130 and/or particular applications 128, such as the touchscreen software, may include software for utilizing the virtual keyboard. In one example, the software may include an input handling module to process touch inputs from the touchscreen 140 and translate them into key presses. In a further example, the software may include a rendering engine responsible for drawing the keyboard's visual elements on the touchscreen 140, including keys, backgrounds, visual hints, and animations. In a further example, the software may include one or more application program interfaces that allows the virtual keyboard to either one-directionally or mutually communicate with other software applications 128 or one of the operating systems 130. The virtual keyboard in this example may further include a virtual trackpad region located adjacent to the keyboard. In many implementations, the trackpad is located below the virtual keyboard, between the spacebar location of the keyboard and the bottom edge of the computing device, to mirror the typical location of a trackpad on a conventional laptop. The virtual trackpad region (also referred to as the "virtual trackpad" herein) may include subregions associated with virtual trackpad buttons. These buttons may be located in the typical region in which trackpad buttons are normally located in a conventional laptop, e.g. two buttons—a left button and right button—at the bottom edge of the trackpad.

Figure 2:
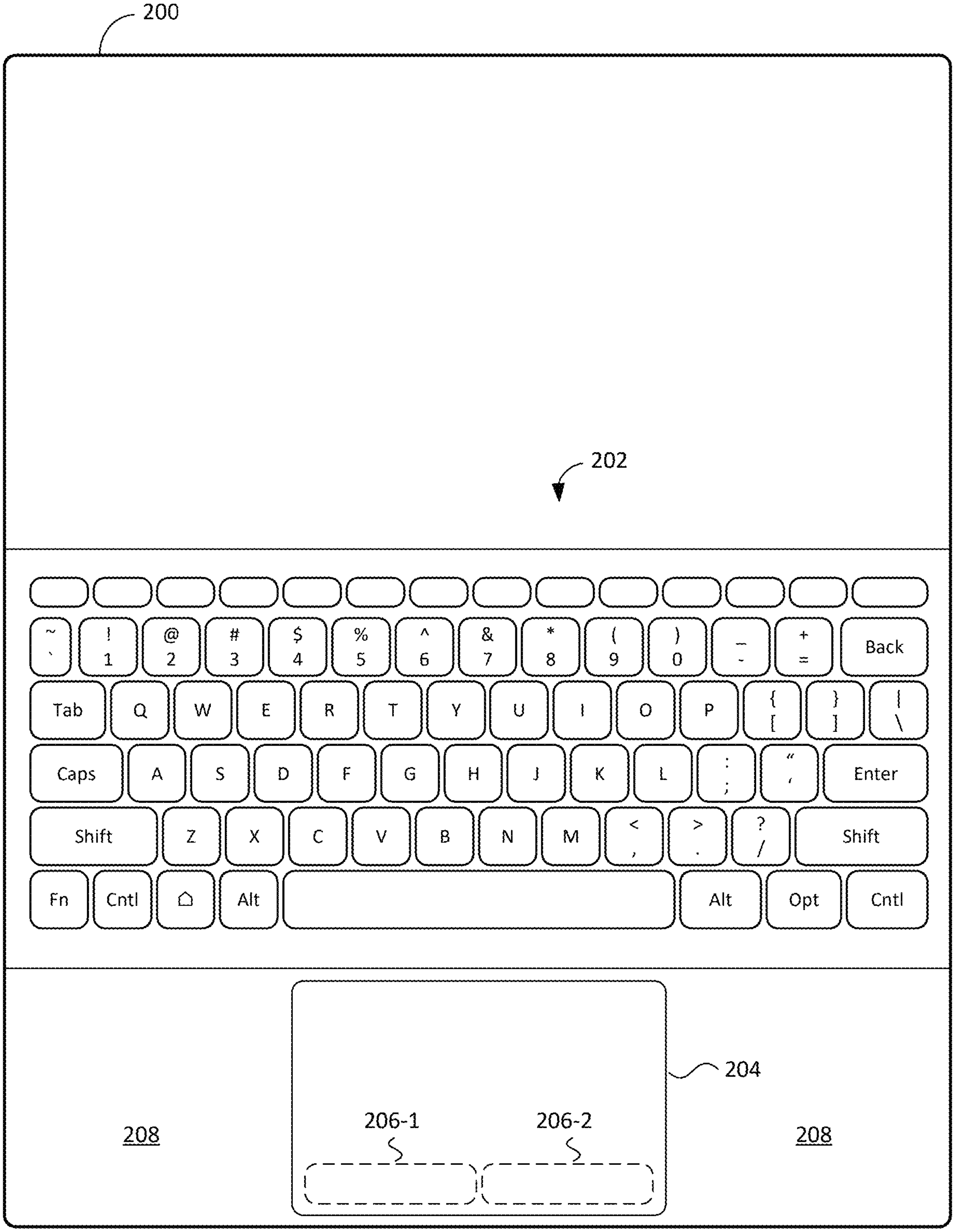
FIG. 2 illustrates an example touchscreen showing a virtual keyboard.

Reference is now made to FIG. 2, which diagrammatically illustrates an example touchscreen 200 showing a virtual keyboard 202 that includes a virtual trackpad 204. The virtual trackpad 204 in this example includes virtual trackpad buttons 206, shown individually as a left virtual trackpad button 206-1 and a right virtual trackpad button 206-2.

Just as the virtual keys of the virtual keyboard 202 may be rendered graphically on the touchscreen 200, the virtual trackpad 204 may be rendered on screen to visually guide users to the area in which they can utilize the touchscreen as a "trackpad" for inputting gestures and/or activating the virtual trackpad buttons 206.

When typing on the virtual keyboard 202, it is common for a user to rest their palm or palms on the regions adjacent to and on either side of the virtual trackpad 204. This may be referred to as a palm rest region 208 in the description below. In some cases, the palm rest region 208 may be referred to as an "extended region" or the like. In the examples herein, the palm rest region 208 or extended region refers to the portion of the touchscreen. For example, the palm rest region 208 may be located below the display of a virtual keyboard but excluding the virtual trackpad region located below the display of the virtual keyboard. In some examples, the palm rest regions may be located laterally adjacent to, and on either side of, the virtual trackpad region.

On a conventional keyboard, the user may rest his or her palms on either side of the trackpad of a laptop or similar device. In such cases, the palms rest on the device casing. With a virtual keyboard 202 rendered on a touchscreen and having a virtual trackpad 204 below it, the palm rest region 208 is a touch-sensitive area and there is the possibility that a palm rest in that area will trigger unwanted actions. In some cases, a palm may touch both the palm rest region 208 and the virtual trackpad 204. In some cases, in the course of attempting to provide input using the virtual keyboard 202, a user's palm may slide from the palm rest region 208 into the virtual trackpad 204. In some instances, a user's thumb may rest near the upper end of the virtual trackpad 204 or may touch the virtual trackpad 204 in the course of "pressing" the spacebar on the virtual keyboard 202. Those and other similar situations may result in inadvertent and unwanted touch events detected within the virtual trackpad 204 that may cause a cursor to move unexpectedly or other undesirable behavior.

Figure 3:
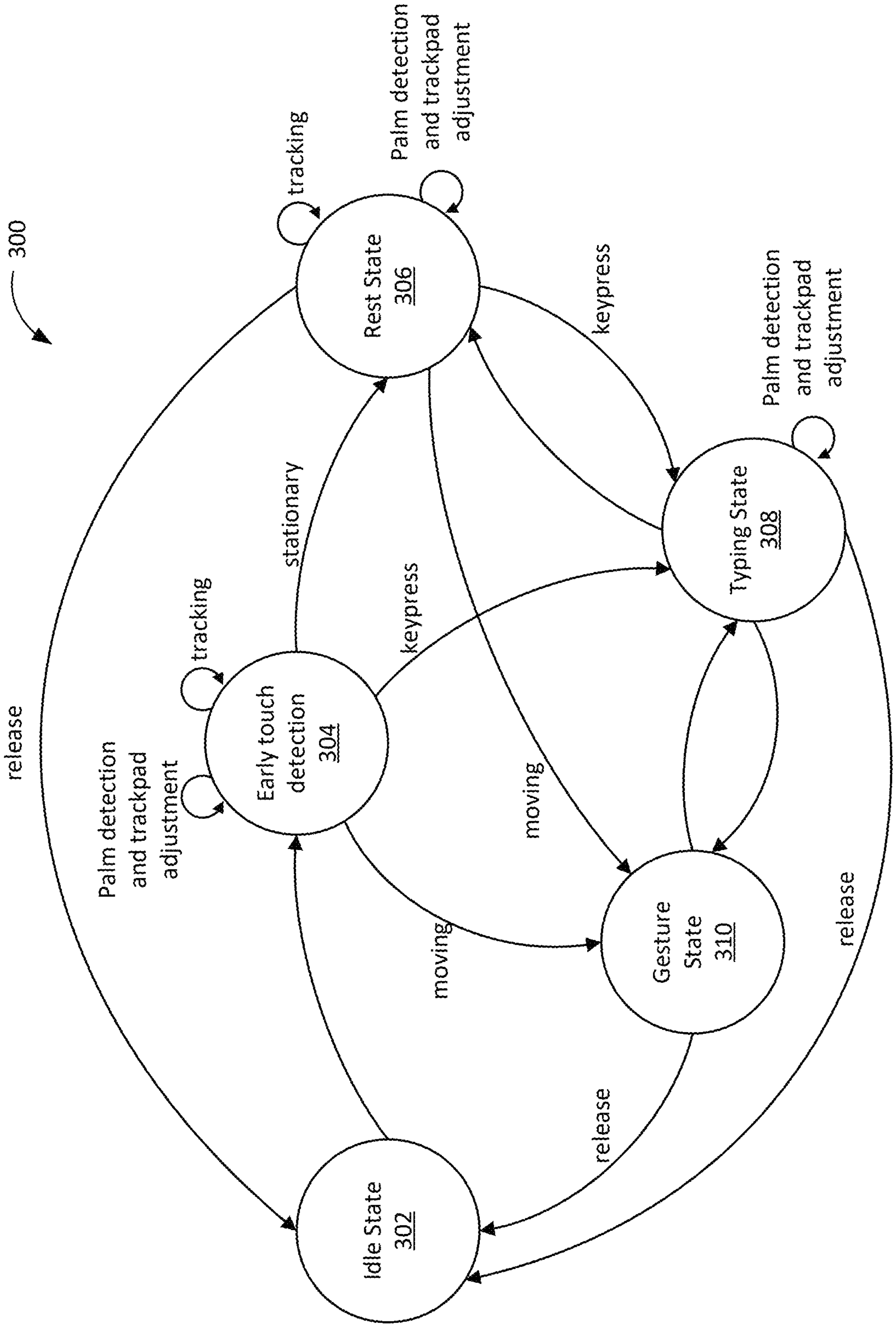
FIG. 3 shows an example state transition diagram.

Reference is now made to FIG. 3, which shows an example state transition diagram 300 for trackpad touch handling. In particular, the state transition diagram 300 may guide the touchscreen application or other touchscreen handling software in when and/or how to interpret touches on the virtual trackpad or to exclude touch events on the virtual trackpad.

Some conventional laptops that have a physical keyboard and a touch-sensitive trackpad adjacent to the keyboard are designed to avoid unintentional touches on the trackpad through disabling the trackpad whenever keypresses are detected on the keyboard. That is, when a key is pressed on the keyboard, the trackpad may be disabled for a short period of time on the assumption that the user is actively typing and that any touch events on the trackpad are likely inadvertent, like the accidental brush of a palm or thumb. The use of a virtual keyboard and virtual trackpad on a touchscreen allows for a more complex and nuanced handling of trackpad interactions with a view to avoiding unintentional touches triggering unwanted operations but still permitting intentional operations on the trackpad.

The state diagram 300 includes an idle state 302 in which it is awaiting detection of a touch event. Once the capacitive touch interface detects a sufficient capacitive signal to be determined or identified as an early touch event, or a hover event in some cases, then the device may enter an early touch detection state 304 in which it tracks and monitors the touch event(s) based on successive frames of capacitive signal data. While in this state 304, the device may perform some initial palm detection and trackpad disablement. For example, it may identify that the detected touchpoint or touchpoints have palm-like characteristics, which may include some combination of one or more of the size of the touch event, the location (e.g. in the palm rest region) the trajectory of movement, the speed of movement, and/or the combination of such touch characteristics with one or more early touch events in the keyboard area. In some cases, such early touch events may end up being gestures. Some may end up being typing activity. Some may be a rest or anchor position in which a user engaged in touch typing rests a hand or both hands in a typing position without actively pressing any particular key. Based on detection of a likely palm and/or thumb touch in this state 304, the device may modify the trackpad input processing.

Modifying the virtual trackpad input processing may include disabling the trackpad, i.e. ignoring or filtering touch events within the virtual trackpad area. That is, any capacitive signal data indicative of touches within the trackpad area is ignored for at least a period of time. In another example, modifying the virtual trackpad input processing may mean setting a different, higher touch detection threshold for identifying a touch event within the virtual trackpad. In other words, the device may ignore lighter lower-pressure touch events on the assumption that they are inadvertent and unintentional touches, but may react to more deliberate touch events of higher intensity. In some cases, that modification may be combined with a condition that the touch event be sufficiently localized (e.g. of a diameter or size below a maximum and above a minimum). In this manner, the device only identifiers a touch event within the virtual trackpad if it is of sufficient intensity and of a size indicative of a finger or thumb press that is likely deliberate and intentional.

To the extent that the device determines that the touch event(s) in the early touch detection state 304 are sufficiently stationary, it may transition to a rest state 306. Rest state 306 may be associated with certain touch filtering or debouncing in some cases. As noted above, rest state 306 may be realized under conditions in which the touch events indicate a hand or both hands in a "rest" position. For example, a touch typing rest position may include one or both palms detected in or near the palm rest region and a plurality of finger touches in a rest position on the virtual keyboard, such as in the "home row" position. In another example, a single hand may be in rest position, in which a palm-sized touch is detected in the palm rest region and two or more fingers are detected on the virtual keyboard in a stationary or rest position.

While in the rest state 306, the device may continue to monitor for palm detection in or near the palm rest regions and may, based on capacitive signal data, modify the trackpad input processing. In some cases, when in a rest position, the trackpad may be disabled. In some cases, the trackpad may remain enabled but the threshold for detecting input may be changed. In some cases, regions or portions of the trackpad may be disabled or may be subject to higher thresholds for detection of touch events. For example, in anticipation that a user may rest a thumb near the space bar when in a rest position, an upper region or portion of the virtual trackpad may be disabled, may have a higher touch detection threshold set, or may filter out touch events that have an axis and size indicative of a thumb touch as opposed to a fingertip touch.

The device may enter a typing state 308 if the device detects a keypress on the virtual keyboard. The typing state 308 may be entered from a rest state 306 in some cases, such as if a new touch event is detected on a keycap with sufficient intensity to indicate a keypress. This may or may not be coupled with detecting a lifting of one or more touch events from the resting position. In some cases, the typing state 308 may be reached directly from the early touch detection state 304.

While in the typing state 308, the device may continue to monitor for palm detection in or near the palm rest regions and may, based on capacitive signal data, modify the trackpad input processing. In many cases, when in the typing state 308, the trackpad may be disabled. In some cases, the disabling of the trackpad may be dependent on the keypresses. For example, the trackpad may be enabled if a keypress is detected on one or more of the modifier keys, such as SHIFT, CTRL, or the like, since those keypresses may be combined with a gesture or input cursor movement, e.g. in the act of highlighting or selecting in a text editor.

The state diagram 300 may further feature a gesture action state 310 in which a gesture is detected, for example within the virtual trackpad region.

From any of these states, a release of all touches may return the device to the idle state 302.

Figure 4:
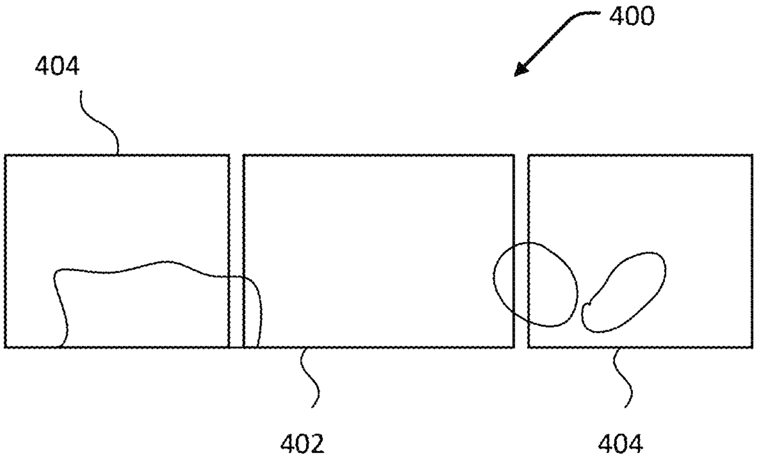
FIG. 4 shows a simplified example of a portion of a touchscreen.

FIG. 4 diagrammatically shows a simplified example of a portion of a touchscreen 400 that illustrates capacitive signal data from a user's hands when in a touch-typing position. In particular, the image shows a trackpad region 402 and palm rest regions 404 on either side of the trackpad region 402. A virtual keyboard (not shown) would be displayed on the touchscreen 400 immediately above the trackpad region 402 and the palm rest regions 404.

The capacitive touch data shown on FIG. 4 is illustrative of data sensed based on a user's palms resting in the palm rest regions 404. It will be noted that the left-hand palm touch is a large contiguous blob shaped like the base of the palm. It will also be noted that a portion of the touch event is sensed from within the trackpad region 402. The right-hand palm touch appears in two blobs. These correspond to the thenar and the hypothenar regions of the base of the palm and appear in the capacitive sensor data as two separate touch events. In some cases, these may be recognized as a palm touch in part by their size, their somewhat elliptical shapes, their axes of orientation relative to each other, and/or the distance between them. It will further be noted that at least one of these touch events is partly in the virtual trackpad region 402.

As noted above, the present application describes detecting palm touch events in the palm rest regions 404 and, based on that detection, modifying the processing of touch data in the trackpad region 402.

Figure 5:
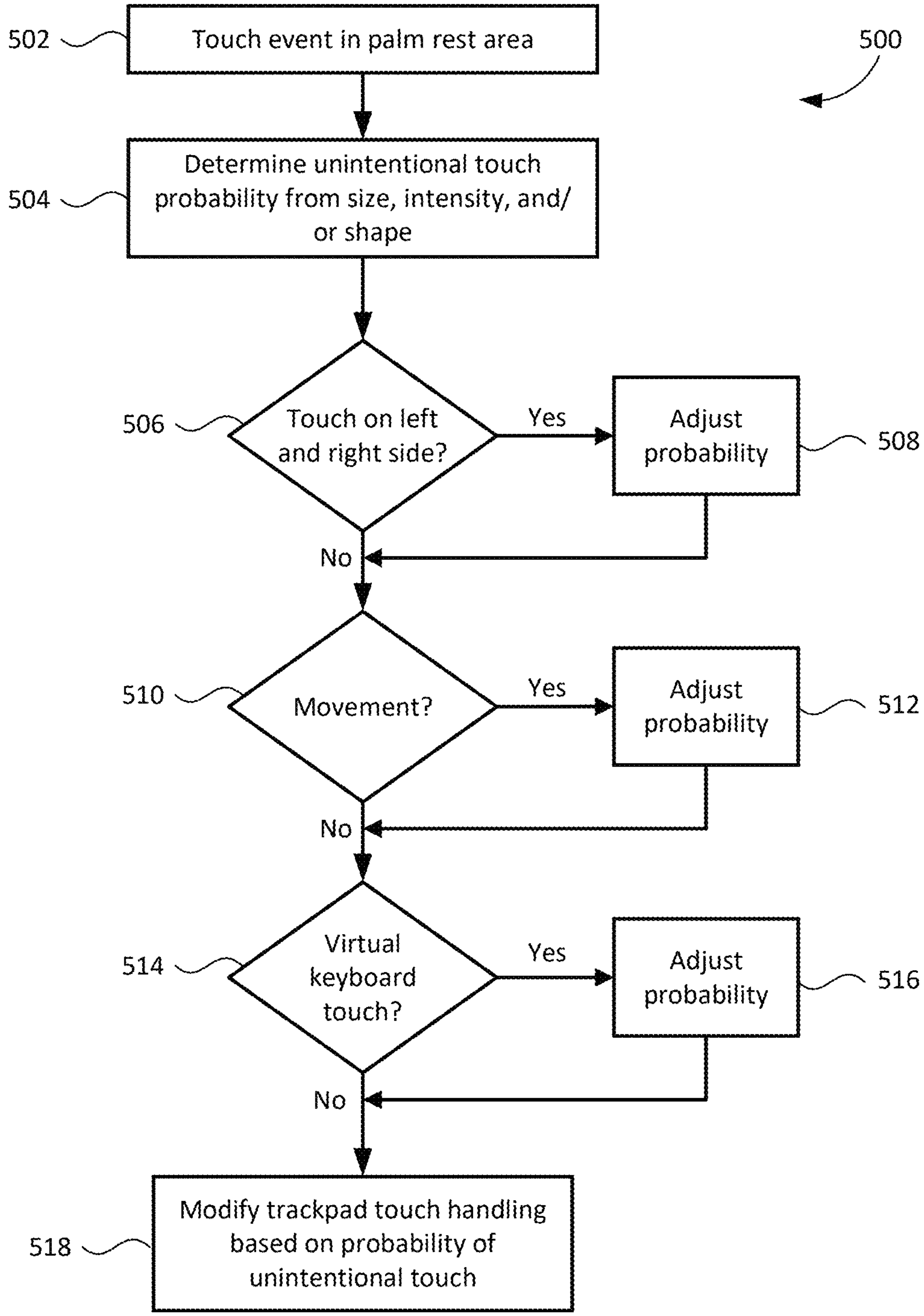
FIG. 5 shows, in flowchart form, one example method for modifying trackpad touch signal processing based on touch data from a palm rest region.

Reference is now made to FIG. 5, which shows, in flowchart form, one example method 500 for modifying trackpad touch signal processing based on touch data from a palm rest region. The method 500 may be implemented by software within a computing device having a touchscreen and, in particular, a touchscreen configured to display a trackpad. The software may be application software in some cases. The software may be operating system software. The software may be executed at the application level or at the system level. In some cases, the software at least partly executes within the kernel. In some cases, the software is user interface software for displaying and receiving input from a touchscreen configured to display a virtual keyboard and a virtual trackpad.

The method 500 includes detecting a touch event in the palm rest region (i.e., in the extended touch-sensitive region located on either side of the virtual trackpad). This detection may occur during an early touch state, e.g., when no other touch events have been recorded or are being tracked; during a rest state, e.g., when the device has determined that the hand or hands are in a rest position with regard to the virtual keyboard; or during a typing state, e.g., when the device is detecting and processing keystrokes on the virtual keyboard.

In this example, the device determines whether the detected touch is unintentional or not and modifies the processing of trackpad touch data, if any, as a result. One type of unintentional touch is a palm touch. Another type may be a thumb touch.

In operation 504, the device determines an unintentional touch probability based, at least in part, on the size of the capacitive blob identified in the capacitive signal data. For example a touch event with an associated capacitive blob having a diameter larger than a preset size threshold may be likely to be unintentional as it is too large to be a fingertip. Other factors in determining the unintentional touch probability include the intensity of the capacitive signal. This may include the highest intensity signal in the capacitive blob, the average intensity of a region of capacitive signals around a centerpoint or centroid of the blob, or another measure of intensity. Another factor may be the shape of the blob, e.g. whether it has a generally elliptical shape, etc.

In operation 506, the device may assess whether there are touch events in one or more designated regions, such as on either side of the trackpad, i.e., at least one touch event in each of the palm rest regions. Detecting a touch event in both regions may be more likely to correlate with a touch-typing palm rest and, as such, an adjustment may be made to the probability in operation 508.

In operation 510, the device may, based on a set of frames of capacitive signal data and tracking of the one or more touch events, determine a speed of movement of the touch event(s). A quicker movement and/or a definitive trajectory may be more indicative of a gesture instead of a palm or thumb rest, whereas a slower or resting touch event may be more likely to be an inadvertent touch event, like a palm or thumb rest. A corresponding adjustment to the unintentional touch probability may be made in operation 512.

In operation 514, the device may determine whether there are virtual keyboard touch events. That is, it may factor in whether there are keystrokes or resting on keycaps. A plurality of touch events on keycaps of the virtual keyboard, whether typing or resting, may be more indicative of an unintentional touch event. The specific keypresses may also be indicative of whether the touch events are likely to be intentional or not. For example, a spacebar press may be correlated to unintentional touch events in the upper portion of the trackpad or in accidental palm contact with the palm rest regions. A modifier keypress, such as a SHIFT or CTRL key might be correlated with a gesture that does not necessarily indicate that other touch events are unintentional. A corresponding adjustment to the unintentional touch probability may be made in operation 516.

In operation 518 the device may modify the trackpad touch event processing based on the unintentional touch probability. As noted above, the modification of trackpad touch event processing may include disabling the touchpad in some cases. It may include increasing the threshold for detection of touch events in the trackpad region. It may include disabling or increasing the touch detection threshold for particular portions or parts of the trackpad region.

Although the description above presents the various factors impacting the unintentional touch probability as being assessed in turn, it will be appreciated that they may be assessed in a different order. They may be assessed together or separately. They may be assessed continuously as the device tracks one or more touch events.

By detecting a likely palm touch in the palm rest region before typing or other gestures are detected, the device can pre-emptively modify the processing of touchpad signal processing to avoid likely unintentional palm touches being detected in the touchpad. The device may take into account trajectory of movement of a touch event before disabling or otherwise modifying the processing of trackpad data in some cases.

In some implementations, the device may use a model to determine from various inputs or characteristics of the touchscreen capacitive data whether a touch event is intentional or not, e.g., whether it is a palm touch, and modify the handling of trackpad touch data accordingly. In some cases, the model may include a trained model developed using a machine learning algorithm. In some cases, the model may be a statistical model, such as a Bayesian model.

As described herein, when an unintentional touch is identified, the device may adapt its handling of capacitive signal data associated with the trackpad region for at least a period of time. For example, it may ignore capacitive signal data in the trackpad region or it may adjust the threshold for detection of capacitive signal data in the trackpad region during the period of time. The period of time may, in some cases, be any non-zero duration of time. In one example, the period of time may be fixed, such a preset number of seconds, during which adaptive handling of capacitive data from the trackpad applies.

In some embodiments, the period of time may have a maximum length of time associated with it such that the period of time ends when the maximum length of time has elapsed. For example, in some embodiment, a timer may be set to the maximum length of time when the unintentional touch is identified. When the timer runs out, the period of time ends and the adapted handling of the capacitive signal data associated with the trackpad region may end. For example, the handling of the capacitive signal data associated with the trackpad region may return to its previous or normal functioning. A time is only one example of a time measuring device or method and a person of skill in the art will recognize that other ways of measuring time could be used.

The maximum length of time may be a preset duration of time or it may vary based on one or more factors, such as historical typing speed. For example, a device or system may keep track or measure typing speed or cadence, for example, on a particular device or for a particular user, and may use that information to determine the maximum length of time for a period of time mentioned above. For example, if the typing speed associated with a device is slower, then the maximum length of time for a period of time may be longer, and vice versa. The historical typing speed may be determined, for example, periodically or dynamically each time an unintentional touch is identified. For example, in cases in which the trackpad signals are adaptively handled (e.g. ignored) in part because of detected typing activity on the virtual keyboard, the period of time during which handling is adapted may be based, at least partly, on typing speed. That is, for instance, a slow typing speed may correspond to a longer period of time of disabling the trackpad region after a detected keystroke. A faster typing speed may correspond to a shorter period of time of disabling the trackpad region after the detected keystroke. An example range for the maximum length of time could be between oops and is.

In some embodiments, the period of time may end based on other circumstances or events such as, for example, a determination is made that of that a further touch event is an intentional touch on the trackpad or when one of one or more designated virtual buttons are pressed. For example, if a time such as the timer discussed in the previous paragraph is used, the period of time may end before the maximum length of time has elapsed when an intentional touch is detected on the trackpad, possibly indicating that a user now intends to use the trackpad. Similarly, the period of time may end when one or more designated buttons designed to be used with the trackpad (such as, for example, a Shift or Ctrl button on the virtual keyboard), again, possibly indicating that a user now intends to use the trackpad.

In some embodiments, the period of time may end when an unintentional touch is no longer detected in one of the palm rest regions. As another example, the period of time may end when a capacitive signal in the touchpad region is determined to have characteristics of a gesture input. In a further example, the period of time may end when the device state transitions from a rest state or typing state to an idle state or gesture state.

Figure 6:
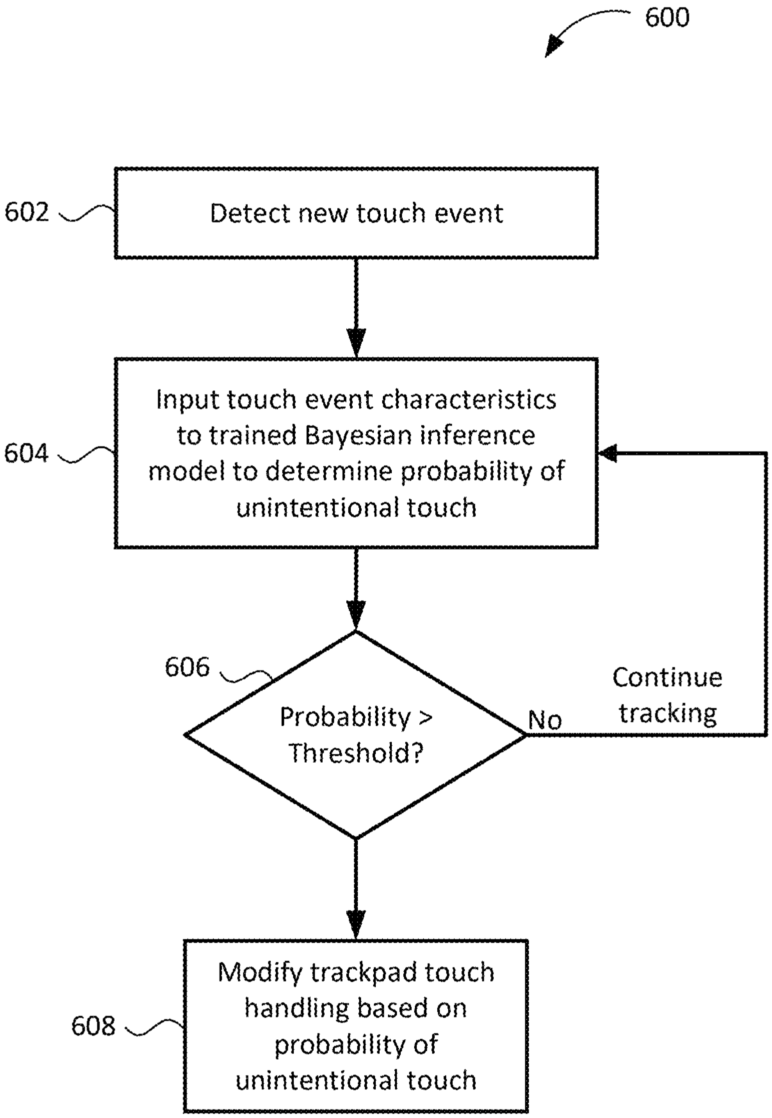
FIG. 6 shows, in flowchart form one example method of modifying trackpad handling based on an unintentional touch determination.

Reference will now be made to FIG. 6, which shows, in flowchart form one example method 600 of modifying trackpad handling based on an unintentional touch determination. The method 600 employs a Bayesian model.

In operation 602, the device detects a new touch event. In one example, the new touch event is in the palm rest region. In another example, the new touch event is in the trackpad region. In another example, the centroid of the capacitive blob associated with the new touch event is in one of those two regions but the capacitive blob itself is partly in both regions.

In operation 604, the characteristics of the touch event are input to a trained Bayesian inference model to determine a probability that the touch event is an unintentional touch. Alternatively, the probability determined by the model may be the probability that the touch is intentional, i.e., that it should be processed as an input, e.g. a gesture, rather than ignored.

The characteristics input to the model may include capacitive signal data or data derived from the capacitive signal data. Example characteristics may include intensity data, e.g. the magnitude of the capacitive signal(s) in the capacitive blob. The intensity may be, for instance, an average signal value in a region around the centroid of the blob. Touches that are of low intensity may be less likely to represent intentional input as they may result from hovering fingers or palms or light incidental contact with the screen. Conversely, a palm rest in the palm rest region or trackpad region may be of high intensity, but may be identified at least partly based on size data as noted below.

Example characteristics may include size data, e.g. the number of continuous points or signals in the capacitive blob that are above the threshold touch detection level. In other words, the size of the capacitive blob. This may be expressed as a count of points within the blob, dimensions of the blob (e.g. diameter, area, etc.), or in another manner. Larger capacitive blobs may correlate with accidental or resting palm touches. Small touches, such as those smaller than a fingertip, may be transient or brushing touches or hovering fingers that do not represent intentional input.

Characteristics may include location data, such as a location on the touchscreen. Touches near an edge of the touchscreen in the palm rest region may be more likely to be unintentional palm or wrist contact with the touchscreen. Touches at the top of the touchpad near the spacebar portion of the virtual keyboard may be more likely to be accidental or resting thumb contact.

Another example characteristic may include movement data determined over two or more successive frames of capacitive data. The movement data may include a speed and/or a trajectory. Slow or stationary touch events are less likely to represent intentional gesture input, particularly if combined with some of the above characteristics indicative of resting hand positions. Fast or deliberate directional movement of a touch event is more likely to be an intentional gesture.

Other possible characteristics input to the model may include a number of touchpoints, virtual keyboard touch data, UI element data correlated to touchpoint locations, and similar data.

The Bayesian model may process these input characteristics and output a probability value indicative of the probability that the touch event is unintentional (or conversely that the probability that it is intentional, depending on model configuration).

In operation 606, the device may assess whether the determined probability is determinative of not. For example, the device may set one or more probability thresholds against which the probability value is compared to determine whether it is sufficiently decisive enough to take action. In one example, if the unintentional touch probability determined is above 0.8 or 0.9, then the device may determine that the touch event is unintentional. Conversely, if the unintentional touch probability is below 0.2 or 0.3, then the device may determine that the touch event is intentional.

If the probability falls within the probability thresholds, then the device may need additional data to better refine the probability determination. Accordingly, it may await input of a further capacitive frame. The additional data may provide additional size, intensity, shape, speed, and/or trajectory information that may refine the model's assessment of the touch event and the probability that it is unintentional. For example, the size or intensity may change over time, making it more apparent whether the touch event is likely a palm rest or a gesture or a transient accidental touch, etc. The additional capacitive data may improve the assessment of speed or trajectory, which may give a better understanding of whether the touch event is stationary or moving and, if moving, whether moving quickly or only shifting slightly.

If the probability assessed in operation 606 is sufficiently decisive, then in operation 608 the device may modify the trackpad touch handling. For instance, if the likelihood is that the touch is unintentional, then the trackpad may be disabled or may have its thresholds increased for detection of touch inputs. The determination that a touch event in the palm rest region is likely unintentional may be the basis for increasing a touch detection threshold for the trackpad on the assumption that the unintentional touch event may stray into the trackpad region and cause unwanted UI behavior.

As another example, if the input is likely intentional then the trackpad may continue to process input touch data as potential gesture input. If the touch event evaluated by the model originated in the palm rest region, the trackpad region may be left active in anticipation that the gesture may enter the trackpad region as part of an intentional touch event.

In another implementation, the probability determination from the Bayesian model may be combined with other data from the touchscreen in determining how to handle the trackpad data processing. For instance, the probability may be one input to an algorithm or further model for determining whether to disable or modify trackpad touch data handling. The other inputs may include whether there is typing activity on the virtual keyboard, whether a modifier key has been pressed on the virtual keyboard, the location of the unintentional touch event or other such inputs.

In a further implementation, rather than determining whether a touch event is intentional or unintentional, the Bayesian model may be specifically trained to determine whether touch events in the palm rest region are likely to be palm rest events. Then on the basis of that probability—i.e., the probability that a touch event(s) is a palm rest—the device may determine whether or how to modify the handling of trackpad touch data. In other words, the Bayesian model may output a probability that the touch event is a palm rest. On detecting a likely palm rest, the trackpad touch event handling may be modified, e.g., disabled or filtered.

As the device tracks touch events on the touchscreen over time, it may alter its handling of the trackpad. For example, the device may initially determine that touch event(s) in the palm rest region are likely palm rest events and it may, on that basis, disable the trackpad. This determination may be made partly based on also detecting a resting position or anchor position with regard to the virtual keyboard. That is, touch data from the virtual keyboard may indicate resting fingertips or hovering fingertips over the home row of the keyboard. At some point the device may then detect selection (e.g. a touch event) of a modifier key, such as a SHIFT key or FUNTION key or other such key. On that basis, it may re-enable input through the virtual trackpad in anticipation that it might be used to input a gesture relating to the modifier, such moving a cursor or caret in order to highlight or select or move text or objects on the screen.

Figure 7:
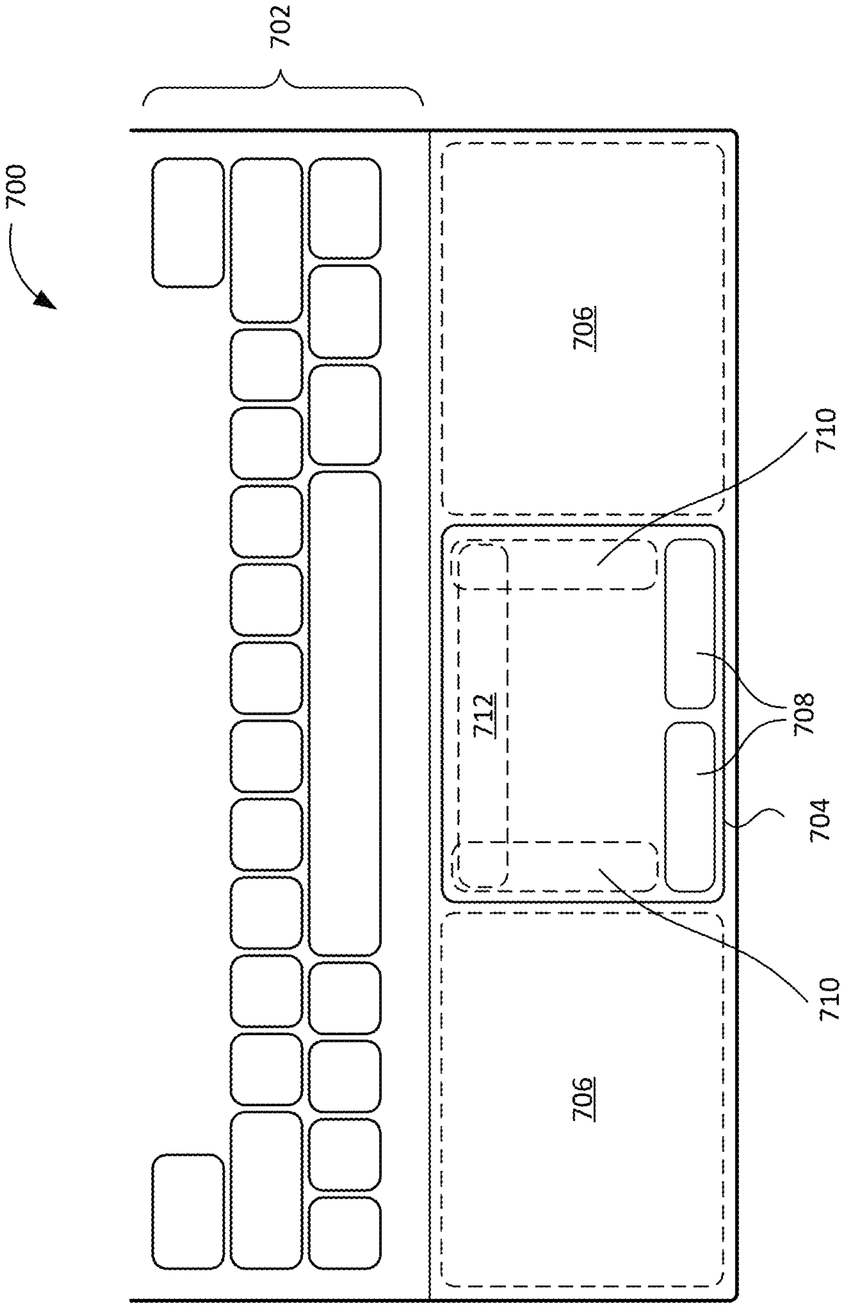
FIG. 7 illustrates an example touchscreen showing a virtual keyboard below which is located a virtual touchpad.

The modification of the trackpad touch data handling may include treating different areas of the trackpad differently, depending in part on the location and/or nature of the touch event(s). Reference is now made to FIG. 7, which illustrates an example touchscreen 700 showing a virtual keyboard 702 below which is located a virtual touchpad 704. The extended regions on either side of the virtual touchpad 704, e.g. the palm rest regions 706, are indicated by stippled lines.

The virtual trackpad 704 may, in some implementations, include trackpad buttons 708. These may be graphically indicated on the touchscreen 700. A touch event on the trackpad button 708 portion of the virtual trackpad 704 may be treated as a button press, subject to it being of sufficient intensity and of a certain size or shape indicative of a finger or thumb press.

The trackpad 704 may have other defined regions that are not necessarily indicated visually on the touchscreen 700 but that may be handled differently depending on touch events in the palm rest regions 706. For example, the trackpad 704 may have left and right border regions 710 and/or a top border region 712.

When the device modifies the handling of trackpad touch event data, it may, for example, disable touch event input in one or more of the border regions 710, 712, while still accepting touch event inputs in the remainder of the virtual trackpad. It may exclude touch event data in the trackpad button 708 region, unless the input corresponds in shape, size, intensity and/or duration to an intentional button press. It may increase the threshold for detecting touch events in one or more of the border regions 710, 712.

The border regions 710, 712, in which touch event handling is modified may depend on the location of touch events in the palm rest regions 706. For example, a touch event detected in the left hand palm rest region 706 may cause modification of touch event handling in the left-hand border region 710, but not the right-hand border region 710. In some cases, the modification to handling of touch event data in the border regions 710, 712 is dependent on whether the touch event is sufficiently proximate the border regions 710, 712, e.g. within a threshold distance. In some cases, the modification to handling of touch event data in the border regions 710, 712 is dependent on whether the touch event has a trajectory towards the virtual trackpad 704. Other such conditionals may be imposed in determining whether or how to modify trackpad touch data handling.

In some implementations, the size of the border regions 710, 712 within which capacitive signal handling is adjusted may be dynamically changed based on one or more characteristics of the touch event(s) in the palm rest regions 706. For instance, the location of the palm touch may be the basis for determining the size or dimensions of the border region(s) 710, 712. As an example, a palm touch on the left-hand side may be the basis for adjusting handling of the left-hand border region 710. The closer the palm touch is to the trackpad 704 edge, the larger the device may make the left-hand border region 710. Other characteristics may also be used as factors in setting the size of the border regions 710, 712, such as the pressure/intensity of the touch event, the trajectory of the touch event (i.e. whether its towards the touchpad 704 or not), the distance from the touchpad 704, and/or other factors.

As illustrated in FIG. 4, in some instances a palm touch may produce two touch points in close proximity. This results from two parts of the palm contacting the touchscreen surface. This may occur in the palm rest region, in the trackpad region, across both regions or elsewhere on the touchscreen. The device may be configured to distinguish between this type of accidental two-point palm touch and a two-finger gesture touch. For example, the accidental two-point palm contact is filtered or ignored whereas the two-finger gesture touch is processed as gesture input. In some cases, a suspected two-point palm touch may result in adjustment, i.e. increase in the touch detection threshold to filter out unintentional palm touches but permit intentional focused two-finger gestures. The device may base the filtering partly on a combination of size and intensity of the capacitive blobs associated with the two touchpoints. A two-finger gesture is likely to have more intense and focused touchpoints indicating deliberate fingertip presses, whereas an accidental two-point palm touch is more likely to be of light intensity and diffused across a larger area.

In another example, two or more touch points may result from accidental palm contact together with intentional finger input. For example, in attempting to input a one or two finger gesture, the user's palm may nevertheless also contact the touchscreen, resulting in two or three touchpoints detected by the device.

The device may be configured to modify handling of virtual touchpad touch event data by determining whether one or more of a two or three touch point input is likely accidental. At least some of the touchpoints may be detected on the virtual touchpad.

In one example implementation, identification of accidental palm contact versus two or three finger gestures is partly based on distance between the touchpoints. A greater distance is indicative of a palm touch and a single or two finger input spaced apart from the palm touch. The location may also be a factor in identifying one of the touches as a likely palm touch. For example, a touch point at the bottom edge of the trackpad may be an accidental palm touch when detected in combination with one or more touch events proximate the upper part of the virtual trackpad.

A binary distance threshold may be used in some implementations to distinguish between likely palm touches and likely two-finger gestures. For instance, if the distance between two touches is greater than the binary distance threshold, then one of them is likely a palm touch and the other input is likely intentional. The identification of which is likely a palm touch may be based on one or more of location of the touchpoint (e.g. the point lower on the touchscreen or proximate the edge of the touchscreen), the size of the touchpoint (e.g. a larger less intense touchpoint), or other such characteristics. If the distance between the two touches is below the binary distance threshold, then the device may, in some cases, filter or ignore the touch events on the basis that they may be a two-point palm touch or a hand resting position. In some cases, the filtering determination is partly based on touch event size and or intensity to permit input and detection of intentional two-finger gestures. For instance, if the distance is below the binary distance threshold, but the two touch points are distinct, are of sufficient intensity, and are within a set range of sizes indicative of fingertips, then the touch may be processed as a gesture.

In another implementation, the device may use a weighted sensitivity model that adjusts touch sensitivity based on the distance between the two touch events. That is, it uses a gradual sensitivity modulation based on proximity of two touch events. When the distance is greater, the device enables normal touch processing for the likely finger input and filters the likely palm touch. When the distance between the two touches is shorter, the threshold for touch detection is progressively increased so as to filter out resting positions or two-point palm touches that are unlikely to be intentional gesture input, but still permit two-finger gestures on the basis that they will be focused intense touchpoints even if in close proximity, for instance if inputting a two-finger "pinch or expand to zoom" gesture on the virtual trackpad.

Figure 8:
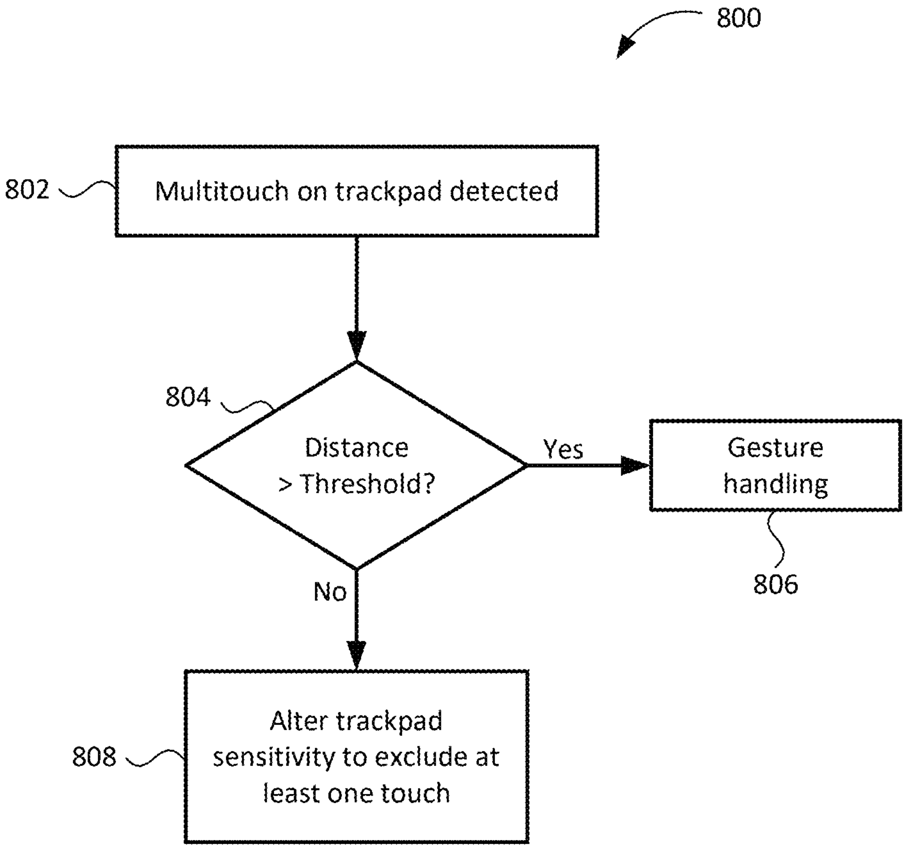
FIG. 8 shows in flowchart form one example method of modifying virtual trackpad touch event handling based on touch event distance.

Reference is now made to FIG. 8, which shows in flowchart form one example method 800 of modifying virtual trackpad touch event handling based on touch event distance. The method 800 may be implemented by software within a computing device having a touchscreen and, in particular, a touchscreen configured to display a trackpad. The software may be application software in some cases. The software may be operating system software. The software may be executed at the application level or at the system level. In some cases, the software at least partly executes within the kernel. In some cases, the software is user interface software for displaying and receiving input from a touchscreen configured to display a virtual keyboard and a virtual trackpad.

In operation 802, the device detects two or more touchpoints (e.g., touch events) in the trackpad region. In some cases, the device detects a touchpoint in the trackpad region and a second touchpoint in the extended region (e.g., the palm rest region) adjacent to the trackpad. The second touchpoint may be closely adjacent to the trackpad region. The device may nevertheless determine that the two touchpoints are a potential gesture input on the basis that the two points are within a threshold maximum distance from each other, despite the fact that one of the points is not directly in the touchpad region. In some cases, the determination may further or alternatively take into account the distance of the second touchpoint from the edge of the trackpad region; that is, it may determine that it is within a maximum distance from the edge of the trackpad.

In operation 804, the device determines the distance between the two touchpoints and assesses whether the distance is greater than a distance threshold value. Touchpoints that are too close together may be less likely to be a gesture input and more likely to be unintentional multipoint touches. Unintentional multi-point touches may include two-point palm touches or hand rest positions. Unintentional multi-point touches may include accidental palm or thumb touches when inputting a one-finger gesture on the trackpad.

In the example of FIG. 8, the determination of whether a multi-point gesture is intentional or not is based solely on the distance between the points. Accordingly, if the distance is greater than the distance threshold in operation 804, then in operation 806 the touchpoints are sent to gesture handling. That is, the device treats the two touchpoints and an intentional gesture and invokes a gesture handling routine to process them accordingly. In some cases, this may include further assessment and potential filtering of the two touchpoints, such as to evaluate whether they are of a size, shape, and/or intensity indicative of intentional gesture input. The two touchpoints may be tracked to determine the gesture, e.g. a pinch-to-zoom, two-finger swipe, etc. In tracking the gesture, it may be determined that it does not represent a two-finger gesture based on movement and/or characteristics of the touch events. For example, one of them may end up being recognized as a more likely palm touch based on its lack of movement and its size and intensity. The device may transition from multi-point gesture handling to single-finger gesture handling in such a case.

If the distance is less than the distance threshold in operation 804, then the device may alter the trackpad handling in operation 808. In some cases, this may include filtering touch data associated with one of the touchpoints on the basis that it is likely unintentional. In some cases, this may include increasing the touch detection threshold for a portion of the trackpad. In some examples, the threshold for detection of touch events may be increased for the whole trackpad, thereby ensuring that only firm deliberate touch events are detected as intentional input. In some instances, the adjustment to trackpad touch handling may include different adjustments in different zones of the trackpad, such as increasing the threshold for touch detection in certain regions, such as border regions. This may have the effect of filtering or ignoring one of the touchpoints detected earlier using a lower regular threshold for touch detection.

In some examples, the relative positioning of the touch events may be the basis for identifying which touchpoint is likely unintentional. For example, a touchpoint closer to a bottom edge of the trackpad may be more likely to be unintentional palm input than a touchpoint closer to the middle or top edge of the trackpad. Other characteristics of the touch events may also be factors, including size, shape, intensity, etc.

In another example, the device applies a weighted approach to trackpad touch handling in the case of multipoint touches. That is, if there are two touchpoints on the trackpad, the device determines their distance and adjusts the touch detection threshold for touch detection accordingly. As the touchpoints move closer or further apart, the touch detection threshold may be adjusted accordingly. For example, the closer together the touchpoints are, the higher the touch detection threshold, so the more aggressively the device filters out touch data. As touchpoints move further apart, then touch detection threshold is reduced until it reaches a point of normal sensitivity to touch interactions.

Figure 9:
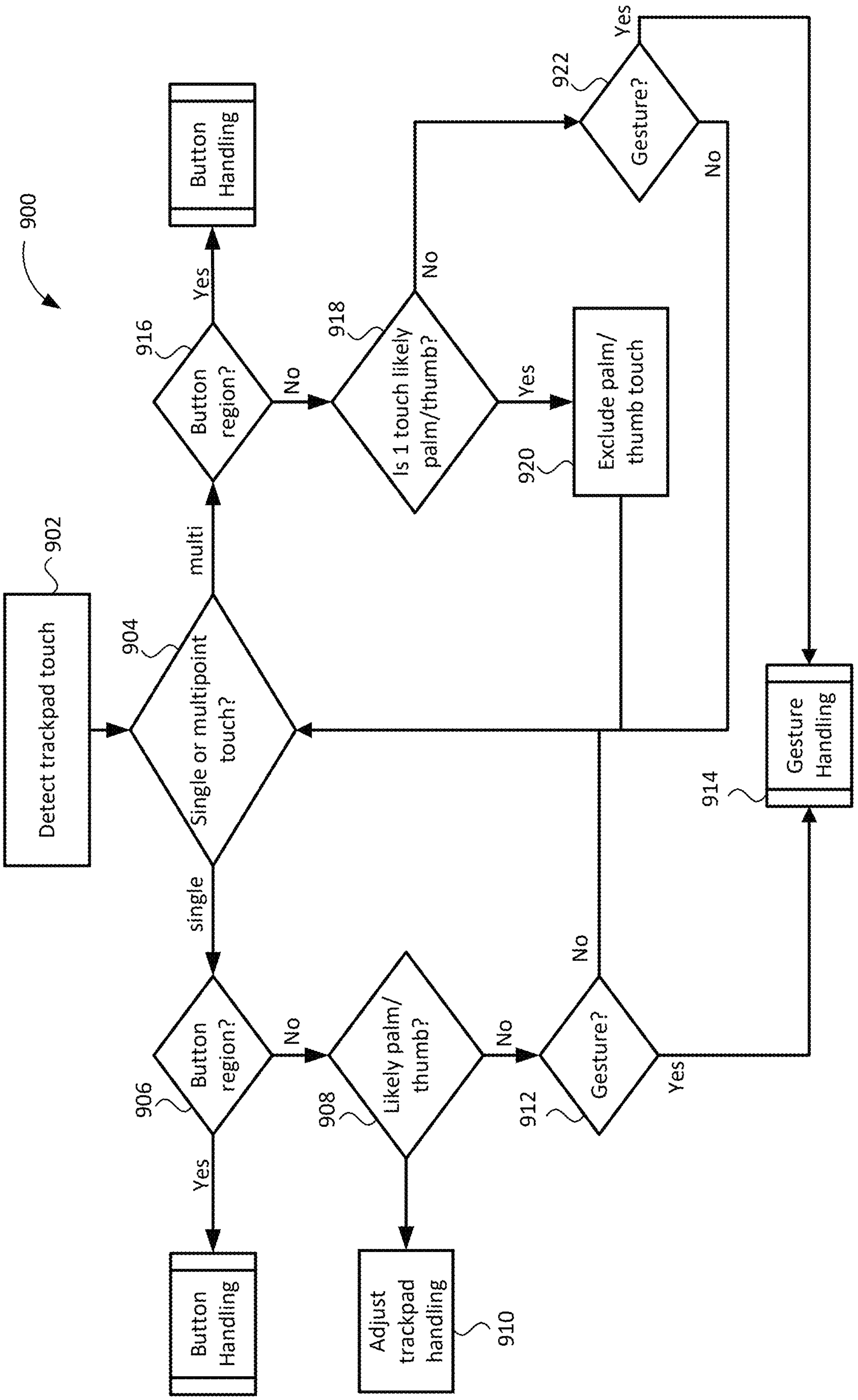
FIG. 9 shows, in flowchart form, one example method of trackpad touch processing.

Reference is now made to FIG. 9, which shows, in flowchart form, one example method 1000 of trackpad touch processing. The method 900 begins with detection of one or more touch events in the trackpad region, as indicated by operation 902. This may include receiving one or more frames of capacitive touch data representing the intensity of capacitive signals at points in a grid of capacitive sensors in the touchscreen, a portion of which is designated as the trackpad region. The detection of a touch event may include detecting one or more signals in the trackpad region that exceed a minimum touch detection threshold. In some cases, the detection may include detecting two or three or more contiguous signals that exceed the minimum touch detection threshold, e.g. a set of signals that form a capacitive blob having an average or median signal value above the minimum touch detection threshold.

In operation 904, the device assesses whether there is a single touchpoint in the trackpad region or more than one touchpoint in the trackpad region.

If the touch is a single touchpoint, then in operation 906 the device determines whether the touchpoint is within the button region of the trackpad. If so, then it is passed to button handling. Further discussion of trackpad button handling will be provided below. If it is not in the button region, then in operation 908 the device determines whether the touch event is likely an unintentional trackpad touch. As discussed above, this determination may be based on determining a probability. In some cases, a Bayesian model may be used in determining the probability. In some cases, other models or algorithms may be used in determining the probability that the touch is unintentional. Factors used in making the determination may include, among others, the size and shape of the capacitive blob, the intensity of the signals, the speed and/or trajectory of the touch event, the location on the trackpad of the touchpoint, and/or the correlation of the trackpad with other touches like keypresses on the virtual keyboard.

If the determination in operation 908 is that the touch event is likely an unintentional touch, such a thumb or palm rest or a transient touch, then the device adjusts the trackpad touch handling in operation 910. As discussed above, the adjustment to trackpad handling may include disabling the trackpad in some cases. It may include increasing the touch detection threshold to filter out some touch events. It may include adjusting the handling of particular parts or regions of the trackpad.

If the touch is not likely unintentional, then in operation 912 the device may assess whether the input is a gesture. This may include tracking the touch event over successive frames to assess its size, shape, movement, and trajectory. In some cases, it may be a selection operation, a cursor movement operation, a touch-and-drag operation, or other such gestures. Gesture handling may be invoked as indicated by operation 914. While determining whether the touch is a gesture in operation 912, the method 900 may return to operation 904 to assess whether a further touch is detected in the trackpad region thereby converting it to a potential multi-touch gesture and/or whether further frames change the assessment of whether the touch is in the button region and/or is an unintentional touch.

If the device determines in operation 904 that there are two or more touchpoints in the trackpad, then in operation 916 it may assess whether one or more of them is in the button region. If so, then button handling may be invoked. If not, then the device may assess whether one or more of the touchpoints is likely a palm or thumb or other unintentional touchpoints, as indicted by operation 918. As discussed above, this assessment may be based, in part, on the distance between the touchpoints. The device may adjust the threshold for touch detection based on the distance between the touchpoints to filter out one or more touchpoints if the two touches are too close together. The assessment may, in some cases, take into account additional characteristics of the touchpoints including, for example, size, shape, movement, intensity, and/or location.

If the device determines that one of the touches is likely unintentional, e.g. a likely palm touch, then operation 920 it may filter than touch event. That is, it may discard or ignore capacitive signal data associated with that touch event and return to assessment of whether the detected input is a single touch or multi-touch in operation 904. If the second touch event is not likely a palm or other unintentional touch, then operation 922 the device may assess whether the touches represent gesture input on the trackpad. This may include tracking the touch events over successive frames to assess their sizes, shapes, movement, and trajectories. Gesture handling may be invoked as indicated by operation 914. While determining whether the multipoint touches are a gesture in operation 922, the method 900 may return to operation 904 to assess whether there are still two or more touches detected in the trackpad region and/or whether further frames change the assessment of whether the touch is in the button region and/or is an unintentional touch.

As noted above, in some instances a touch event may be detected in the button region of a virtual trackpad. In some cases, this may represent an attempt to select or "push" that button; however, in some cases, it may represent an attempt to initiate a gesture or may be an accidental touch. If an attempted gesture is detected as a button press, it may result in unexpected and undesirable operations in the GUI. Distinguishing between these types of detected inputs would improve functionality of the virtual trackpad and the virtual trackpad buttons.

In accordance with one aspect of the present application, when the device detects a touch event in the virtual trackpad button region, it buffers frames of capacitive data before determining whether the touch event corresponds to a button press or not. Through buffering frames, the device obtains more time to accurately determine whether the touch is a gesture or an accidental/unintentional touch before reacting to it as a button press. In some cases, the device is able to quickly determine from characteristics of the touch event whether it is a gesture or an unintentional touch; however, in some cases, it may take additional frames to determine from the characteristics whether the touch is an intentional button press. This may delay responsiveness of the buttons, but will avoid accidental activation of the buttons and will result in more reliable trackpad functionality.

The number of frames buffered prior to making a determination may be dynamically determined based on characteristics of the touch event. Factors such as speed, direction, intensity, etc., may be used to determine whether additional frames are needed or whether a determination can be made without additional frames. Advantageously, this approach may have a debouncing effect of also avoiding unintentional activation through slight or transient touches in the button region that might otherwise be seen as false positive touches that trigger button activation.

The present application may also differentiate between single finger and multi-finger touches where at least one of the touches is in the button region. In either case, the touches may represent gestures and/or button presses. Button handling may take into account whether the touch is single finger touch or multi-finger touch. In some cases, single finger touch may be more likely to be a deliberate button touch; however, even multi-finger touches may be a deliberate button touch and are not necessarily automatically classified as a gesture. For example, two touch events where one of the touch events is in a button region may represent the start of an attempted gesture input or may represent the selection of a button and a corresponding one-finger gesture input. Even two fingers in the button region may represent a gesture or may represent selection of one or both of the buttons.

Figure 10:
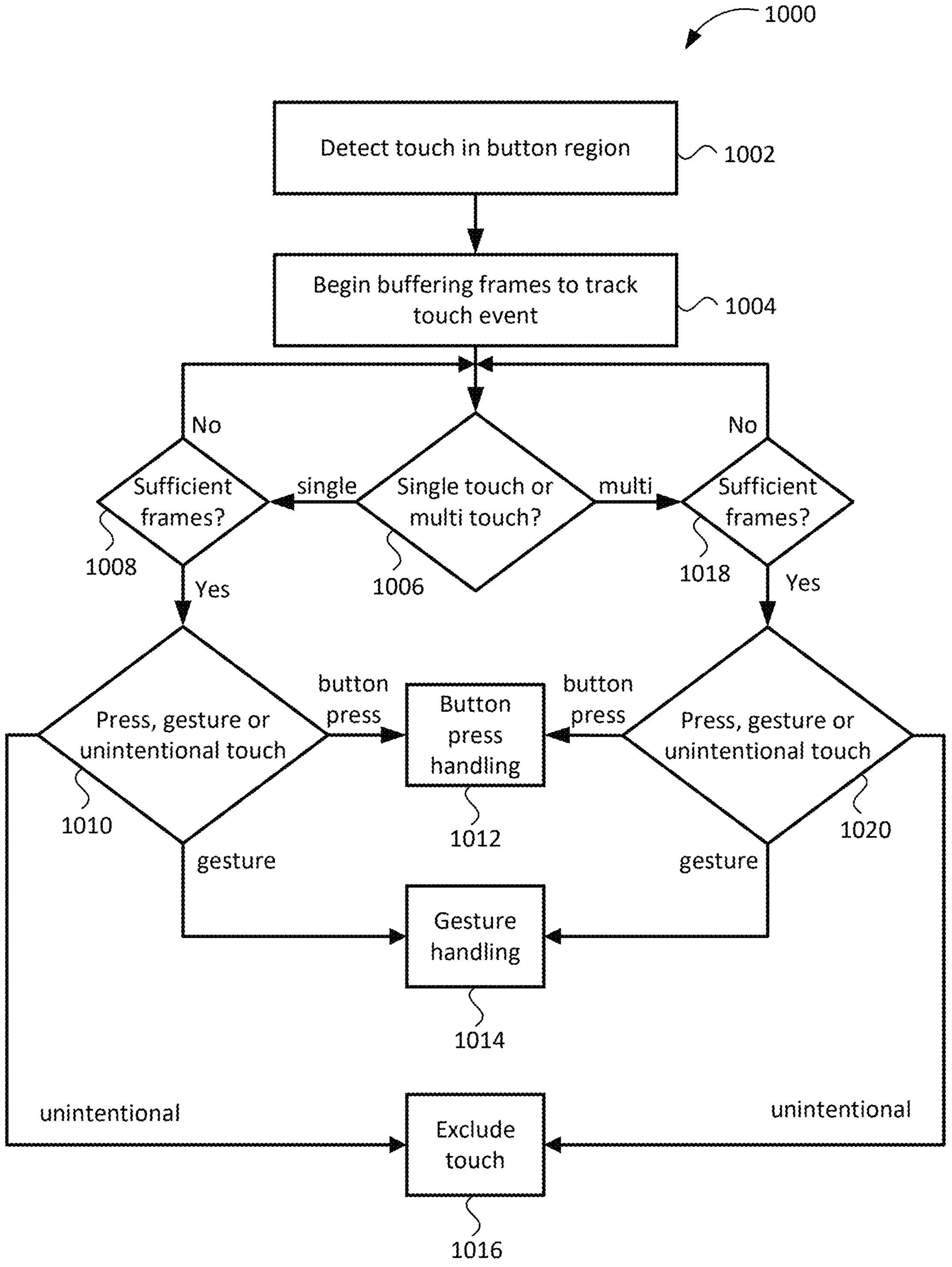
FIG. 10 shows, in flowchart form, one example method for processing virtual touch events in a virtual trackpad button region.

Reference is now made to FIG. 10, which shows, in flowchart form, one example method 1000 for processing virtual touch events in a virtual trackpad button region.

The method 1000 begins in operation 1002 when a touch event is detected in the button region of a virtual trackpad. In operation 1004, the device begins buffering frames. The frames may be frames of touch data from a touchscreen and, in particular, from a virtual trackpad region of the touchscreen. The capacitive touchscreen may produce frames of data from a matrix or grid of capacitive sensors. The data may be pre-processed and provided to virtual keyboard or virtual trackpad software as a set of data readings from the sensors. The data may indicate intensity of the capacitive signal at each sensor location. The frames of data may be buffered in memory. The memory may be a volatile fast access memory associated with the one or more processors in the device executing the software associated with trackpad touch handling.

In operation 1006, the device determines whether the touch data indicates a single touch event or multiple touch events. At least one of the touch events is located in the trackpad button region, as determined in operation 1002. In the case of multiple touch events, in some cases the additional one or more touch events may be located in the button region. In some cases, the additional one or more touch events may be located on in the trackpad adjacent to but not in the button region.

If the event is a single touch event, then in operation 1008, the device determines whether it has sufficient frames available to determine whether the touch is an intentional button press or not. The determination may be based on the characteristics of the touch event. For example, in some cases, it may be possible to quickly determine that a touch event is a gesture based on the speed and trajectory of the touch event. A touch event that moves relatively quickly and on a definitive trajectory is likely to be a gesture input. A touch event that is relatively stationary and/or that moves erratically without a consistent trajectory, is less likely to be a gesture. A touch event that is low intensity is less likely to be a button press. A touch event that is associated with a large capacitive blob, i.e. that is much larger than a fingertip or a thumb press, may be a palm rest or similar unintentional input.

Operation 1008 may involve determining a probability that the touch event is a button press, or a probability that the touch event is a gesture, etc. The number of frames needed to make that determination with a sufficient degree of confidence, e.g. to determine a probability below or above an uncertainty range, may vary depending on the characteristics of the touch event. As noted, a touch event that has sufficient intensity, is within a certain size range, has at least a minimum speed, and a determined trajectory, may be quickly identified as a likely gesture. Conversely, it may take additional frames to determine that a touch event is sufficiently stationary and has sufficient intensity and a size within a certain range, to obtain a high enough probability that the touch event is a button press and not a transient or accidental touch or palm rest. In one example, a touch event that starts in the button region but has an upwards trajectory, i.e. towards the keyboard, is more probable as a gesture since it is likely to swipe or scroll input. This probability may be higher for two-finger touches in the button region that have an upwards trajectory as this aligns with a scroll action or gesture, and is less likely to be a button press due to there being two fingertip touches involved.

There may be a maximum number of frames at which the device makes a determination as to whether a touch event is a button press or gesture or accidental touch, irrespective of whether the probability determined in operation 1008 is outside the uncertainty range. In one example implementation, the uncertainty range is reduced with successive frames so that it becomes increasingly likely that the device makes a determination. In this manner, the device does not end up in a hung state in which it cannot definitively categorize the touch input.

In operation 1010, the device makes the determination as to whether the touch event is a button press, gesture, or unintentional touch. If the touch event is determined to be a button press, then in operation 1012 is it processed as such. If the touch event is determined to be gesture, then in operation 1014 it is processed as a gesture, for example by a gesture handling routine that may continue tracking the touch event and carrying out corresponding UI operations. If the touch event is determined to be unintentional, such as a palm rest, a thumb rest, a transient touch, or such, then in operation 1016 is it excluded as a touch event. Exclusion may include discarding or ignoring the touch data in that location. It may include disabling the trackpad. It may include increasing the threshold for detection of touch events on the trackpad, including the button regions, or other such modification of trackpad touch event handling.

If the trackpad button region touch event detected in operation 1002 is determined to be a multipoint touch event in operation 1006, then the device carries out a similar process as indicated by operations 1018 and 1020. Because there is more than one touch point, the device may take into account information regarding the two touch points and their characteristics in determining the probability that the touches are a button press, a gesture, or one or more unintentional touches. In some cases, the determination of probability may include determining a probability for each of the touches. In some cases, the probability may be a probability for the two or more touches. As described above, in some cases, the distance between the two touches may be a factor in determining whether the touches are a gesture or are more likely an unintentional multi-touch event.

The location of the touches may be a further factor in determining whether they are like a gesture, a button press, or unintentional. The device may also determine whether the gesture is likely a two finger gesture, or whether the touches represent a two finger button press (both on one button, or pressing both a left and right button at the same time), a one finger button press and a one finger gesture, a one finger button press and an unintentional touch, or two unintentional touches. The probability of any of those conditions may be influenced by the distance between the touches, their shape/size, their movement (absolutely and relative to each other), their locations (one on button, two on buttons, etc.), and other such characteristics. In some cases, these characteristics or other capacitive signal data may be input to a Bayesian model or other model or algorithm to determine the likelihood or probability that the touches represent a button press, a gesture, or an unintentional touch. As mentioned above, a touch event that starts in the button region but has an upwards trajectory, i.e. towards the keyboard, is more probable as a gesture since it is likely to swipe or scroll input. This probability may be higher for two-finger touches in the button region that have an upwards trajectory as this aligns with a scroll action or gesture, and is less likely to be a button press due to there being two fingertip touches involved.

If one or more of the touches is determined to be a button press in operation 1018 and 1020, then it is processed as a button press in operation 1012. If one or more of the touches is determined to be a gesture, then gesture handling is invoked in operation 1014. In some cases, the touches may be determined to be both a button press and corresponding gesture, in which case both operations may be invoked. If one or more of the touches is determined to be an accidental or unintentional touch, then in operation 1016 that touch or touches are ignored or discarded in processing the virtual trackpad touch data. As discussed above, the adjustment of trackpad touch data handling in the case of unintentional touches may take different forms in different implementations, including adjustment of touch detection thresholds, changes to particular regions of the trackpad, etc.

In the present disclosure, the terms "a" or "an" are defined to mean "at least one", that is, these terms do not exclude a plural number of items, unless stated otherwise.

In the present disclosure, terms such as "substantially", "generally" and "about", which modify a value, condition or characteristic of a feature of an example embodiment, should be understood to mean that the value, condition or characteristic is defined within tolerances that are acceptable for the proper operation of the example embodiment for its intended application.

In the present disclosure, unless stated otherwise, the terms "connected" and "coupled", and derivatives and variants thereof, refer herein to any structural or functional connection or coupling, either direct or indirect, between two or more elements. For example, the connection or coupling between the elements can be acoustical, mechanical, optical, electrical, thermal, logical, or any combinations thereof.

In the present disclosure, expressions such as "match", "matching" and "matched", including variants and derivatives thereof, are intended to refer herein to a condition in which two or more elements are either the same or within some predetermined tolerance of each other. That is, these terms are meant to encompass not only "exactly" or "identically" matching the two elements but also "substantially", "approximately" or "subjectively" matching the two or more elements, as well as providing a higher or best match among a plurality of matching possibilities.

In the present disclosure, the expression "based on" is intended to mean "based at least partly on", that is, this expression can mean "based solely on" or "based partially on", and so should not be interpreted in a limited manner. More particularly, the expression "based on" could also be understood as meaning "depending on", "representative of", "indicative of", "associated with" or similar expressions.

In the present disclosure, the terms "system" and "network" may be used interchangeably in different embodiments of this application. "At least one" means one or more, and "a plurality of" means two or more. The term "and/or" describes an association relationship of associated objects, and indicates that three relationships may exist. For example, A and/or B may indicate the following three cases: Only A exists, both A and B exist, and only B exists, where A and B may be singular or plural. The character "/" indicates an "or" relationship between associated objects. "At least one of the following items (pieces)" or a similar expression thereof indicates any combination of these items, including a single item (piece) or any combination of a plurality of items (pieces). For example, "at least one of A, B, or C" includes: only A; only B; only C; A and B; A and C; B and C; or A, B, and C, and "at least one of A, B, and C" may also be understood as including: only A; only B; only C; A and B; A and C; B and C; or A, B, and C. In addition, unless otherwise specified, ordinal numbers such as "first" and "second" in embodiments of this application are used to distinguish between a plurality of objects, and are not used to limit a sequence, a time sequence, priorities, or importance of the plurality of objects.

A person skilled in the art should understand that embodiments of this application may be provided as a method, an apparatus (or system), computer-readable storage medium, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device and enable a machine to execute the instructions. When executed by any computer or the processor of a programmable data processing device, the instructions cause the apparatus to implement specific functions as described in one or more procedures in the flowcharts and/or one or more blocks in the block diagrams. The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or on another programmable device provide steps for implementing specific functions as described in one or more procedures in the flowcharts and/or one or more blocks in the block diagrams.

Although the present disclosure has been described with reference to specific features and embodiments thereof, it is clear that a person skilled in the art can make various modifications and variations to this application without departing from the scope of this disclosure. The specification and drawings are, accordingly, to be regarded simply as an illustration of embodiments as defined by the appended claims, and are contemplated to cover any and all modifications, variations, combinations or equivalents that fall within the scope of the present disclosure.

What is claimed is:

1. A computer-implemented method:

receiving capacitive signal data from a touch-sensitive surface that includes a virtual trackpad region is displayed on the touch-sensitive surface, wherein the capacitive signal data indicates a touch event in at least one of one or more designated regions on the touch-sensitive surface;

determining from one or more characteristics of capacitive signal data associated with the touch event that the touch event is an unintentional touch; and based on the unintentional touch, adapting handling of capacitive signal data associated with the virtual trackpad region for a period of time.

2. The computer-implemented method of claim 1, wherein the adapting includes disabling at least a portion of the virtual trackpad region during the period of time.

3. The computer-implemented method of claim 1, wherein the adapting includes setting a size of a portion of the virtual trackpad region based on the one or more characteristics of the capacitive signal data associated with the touch event.

4. The computer-implemented method of claim 1, wherein the one or more designated regions comprise two palm rest regions laterally adjacent to, and on either side of, the virtual trackpad region.

5. The computer-implemented method of claim 1, wherein the adapting includes increasing a touch detection threshold in the virtual trackpad region.

6. The computer-implemented method of claim 1, wherein adapting handling of the capacitive signal data includes disabling the virtual trackpad region based on detection of one or more keypress events, independent of any palm-rest detection.

7. The computer-implemented method of claim 1, wherein the determining that the touch event is the unintentional touch is based, at least in part, on a size of a capacitive blob defined by the touch event being above a size threshold.

8. The computer-implemented method of claim 1, wherein the capacitive signal data indicates a capacitive blob associated with the touch event, and wherein the determining that the touch event is the unintentional touch is based on at least two or more of a size of the capacitive blob, a movement of the capacitive blob, a shape of the capacitive blob, a location of the capacitive blob, and an intensity of the capacitive blob.

9. The computer-implemented method of claim 1, wherein the determining that the touch event is the unintentional touch includes determining a trajectory or speed associated with the touch event and, based on the trajectory or the speed, identifying the touch event as a palm rest.

10. The computer-implemented method of claim 1, wherein the capacitive signal data further includes data indicating one or more touch events on a virtual keyboard, and wherein the determining that the touch event is the unintentional touch is further based on the one or more touch events on the virtual keyboard in combination with the capacitive signal data associated with the touch event in the at least one of two palm rest regions.

11. The computer-implemented method of claim 10 wherein the determining that the touch event is the unintentional touch is partly based on a keypress detected on the virtual keyboard.

12. The computer-implemented method of claim 1, wherein the determining that the touch event is the unintentional touch is based on providing characteristics of the touch event to a trained Bayesian model and receiving from the trained Bayesian model a probability that the touch event is unintentional and comparing the probability to a probability threshold value.

13. The computer-implemented method of claim 1, wherein the determining that the touch event is the unintentional touch includes determining, from the capacitive signal data associated with the touch event, a probability that the touch event is unintentional and comparing the probability to a probability threshold value.

14. The computer-implemented method of claim 13, wherein the probability is a probability that the touch event is a palm rest.

15. The computer-implemented method of claim 1, wherein the period of time has a maximum length of time and the period of time ends when an elapsed time reaches the maximum length of time.

16. The computer-implemented method of claim 15, wherein the maximum length of time is based, at least in part, on a historical typing speed.

17. The computer-implemented method of claim 1, wherein the period of time ends when a determination is made that a further touch event is an intentional touch on a trackpad.

18. The computer-implemented method of claim 1, wherein the period of time ends when one of one or more designated buttons are pressed.

19. A computing device, comprising:

one or more processors;

a touch-sensitive surface coupled to the one or more processors; and memory storing processor-executable instructions that, when executed by the one or more processors, are to cause the one or more processors to:

receive capacitive signal data from the touch-sensitive surface that includes a virtual trackpad region is displayed on the touch-sensitive surface, wherein the capacitive signal data indicates a touch event in at least one of one or more designated regions on the touch-sensitive surface;

determine from one or more characteristics of capacitive signal data associated with the touch event that the touch event is an unintentional touch; and based on the unintentional touch, adapt handling of capacitive signal data associated with the virtual trackpad region for a period of time.

20. The computing device of claim 19, wherein adapting the handling includes disabling at least a portion of the virtual trackpad region during the period of time.

21. The computing device of claim 19, wherein adapting the handling includes setting a size of a portion of the virtual trackpad region based on the one or more characteristics of the capacitive signal data associated with the touch event.

22. The computing device of claim 19, wherein the one or more designated regions comprise two palm rest regions laterally adjacent to, and on either side of, the virtual trackpad region.

23. The computing device of claim 19, wherein adapting the handling includes increasing a touch detection threshold in the virtual trackpad region.

24. The computing device of claim 19, wherein the adapting handling of the capacitive signal data includes disabling the virtual trackpad region based on detection of one or more keypress events, independent of any palm-rest detection.

25. The computing device of claim 19, wherein determining that the touch event is the unintentional touch is based, at least in part, on a size of a capacitive blob defined by the touch event being above a size threshold.

26. The computing device of claim 19, wherein the capacitive signal data indicates a capacitive blob associated with the touch event, and wherein determining that the touch event is the unintentional touch is based on at least two or more of a size of the capacitive blob, a movement of the capacitive blob, a shape of the capacitive blob, a location of the capacitive blob, and an intensity of the capacitive blob.

27. The computing device of claim 19, wherein determining that the touch event is the unintentional touch includes determining a trajectory or speed associated with the touch event and, based on the trajectory or the speed, identifying the touch event as a palm rest.

28. The computing device of claim 19, wherein the period of time has a maximum length of time and the period of time ends when an elapsed time reaches the maximum length of time.

29. The computing device of claim 19, wherein the period of time ends when a determination is made that a further touch event is an intentional touch on a trackpad.

30. A non-transitory, computer-readable medium storing instructions that, when executed by a processor, are to configure the processor to:

receive capacitive signal data from a touch-sensitive surface that includes a virtual trackpad region is displayed on the touch-sensitive surface, wherein the capacitive signal data indicates a touch event in at least one of one or more designated regions on the touch-sensitive surface;

determine from one or more characteristics of capacitive signal data associated with the touch event that the touch event is an unintentional touch; and based on the unintentional touch, adapt handling of capacitive signal data associated with the virtual trackpad region for a period of time.

* * * * *